(12) United States Patent
Lu

(10) Patent No.: US 8,117,652 B1
(45) Date of Patent: Feb. 14, 2012

(54) PASSWORD INPUT USING MOUSE CLICKING

(75) Inventor: Chien-Chih Lu, Danshui Taipei (TW)

(73) Assignee: Trend Micro, Inc., Tokyo (JP)

( * ) Notice: Subject to any disclaimer, the term of this patent is extended or adjusted under 35 U.S.C. 154(b) by 959 days.

(21) Appl. No.: 12/112,402

(22) Filed: Apr. 30, 2008

(51) Int. Cl.
*G06F 7/04* (2006.01)
*G06F 21/00* (2006.01)

(52) U.S. Cl. ........... 726/18; 726/2; 726/4; 726/5; 726/6; 726/7; 726/17; 726/19; 726/21; 726/27; 726/30; 713/182; 713/183; 713/184

(58) Field of Classification Search ................... 726/2–7, 726/16–21, 26–30; 713/182–184
See application file for complete search history.

(56) References Cited

U.S. PATENT DOCUMENTS 5,754,306 A * 5/1998 Taylor et al. .................. 358/400

2004/0030933 A1 * 2/2004 Park ............................. 713/202

* cited by examiner

*Primary Examiner* — Taghi Arani
*Assistant Examiner* — Madhuri Herzog
(74) *Attorney, Agent, or Firm* — Beyer Law Group LLP

(57) ABSTRACT

Digits are randomly distributed into any number of a first group of sets. A type and frequency of a user input action, such as clicking a computer mouse, is associated with each set. Next, all the digits from each set are randomly distributed into a second group of sets. Each of the second group of sets may contain at most a single digit from one of the first group of sets, but may contain any number of digits total. A user input action, is also associated with each set in the second group. To input a particular digit in the password, the user selects one set of the first group of sets that contains the correct digit and selects one set of the second group of sets that also contains the same digit. Selection may occur by mouse clicking, key pressing or touching a screen. Once all digits of the password have been selected in this manner, the software determines the correct digits of the password by comparing the user selections for each digit in the password. The software outputs a result or stores the input password.

18 Claims, 7 Drawing Sheets

US 8,117,652 B1

PASSWORD INPUT USING MOUSE CLICKING

FIELD OF THE INVENTION

The present invention relates generally to inputting a password into a computer. More specifically, the present invention relates to prevention of malicious detection of the input password.

BACKGROUND OF THE INVENTION

It is well established that input of a password by a computer user is the most widely used approach for authenticating the identity of the user. Nevertheless, there is always concern that the input password may be detected and stolen by a malicious software program or hardware device because the input password is simply the combination of keystrokes. Software such as key logger programs and hardware devices can detect and store type user passwords. Key logger programs copy a computer user's keystrokes to a file which are sent to a hacker at a later time. Often the key logger software will only awaken when a computer user connects to a secure Web site such as a bank. It then logs the keystrokes, which may include account numbers, PINs and passwords, before they are encrypted by the secure web site. There are also all hardware key logger devices that attach unobtrusively to a keyboard cable and also record a user's keystrokes (such as typed passwords) for later retrieval for malicious use.

Certain software applications make use of special keyboard software in order to solve this keystroke logging problem, however, an input password may still be captured onscreen. Onscreen capturing works in the following manner. Keylogger software with screen capturing functionality will awaken when a computer user connects to a secure Web site (such as a bank). Any mouse click event will trigger a screen capture in the area around the position of the mouse click. These series of screen-captured files will be stored for later retrieval (e.g., sent back to a hacker's computer.)

Some applications use fingerprint identification or dynamic code through a mobile telephone for identity authentication, but these techniques require additional devices attached to the computer or telephone. The dynamic code technique does not use a fixed password for authentication of the identity. Every time a computer user wants to log in, he uses his mobile telephone to retrieve a code from a remote site which is dynamically generated. The code is basically disposable and will be invalid after log in; the user needs to acquire another code next time from the remote site.

Therefore, a technique is desired that would allow secure input of a password into a computer, telephone or similar device.

SUMMARY OF THE INVENTION

To achieve the foregoing, and in accordance with the purpose of the present invention, a technique is disclosed that allows a user to enter a password and evade detection of that password by malicious hardware or software.

The present invention introduces a password input technique that produces different input behaviors by a user when inputting a password, but actually outputs the same password. Thus, malicious programs and devices attempting to record keystrokes, mouse clicks or onscreen data will find it difficult if not impossible to derive the real password. Because the user's input behavior may change every time the password is entered, there is no way for a malicious program or device to reproduce that input behavior.

The present invention may be implemented as a stand-alone software program, as part of a browser, integrated with keyboard or mouse software, provided as part of any software application, or used by any Web site requiring a user to enter a password. For example, the present invention may be integrated with Trend Micro "Transaction Guard" software in order to keep track of the password and communicate directly with a browser in order to fill out any required password.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention may be used with passwords having any of the ten digits 0 through 9, or any subset of those digits. Further, those digits may be represented in other forms such as in Roman numerals or in other languages. In general, the approach herein can be applied to any ten symbols in order to input a symbol in three clicks for each symbol. For example, the Roman numerals I, II, III, VI, V, VI, VII, VIII, IX and X may be used.

First, the digits are randomly distributed into any number of a first group of sets. A type of user input action, such as clicking a computer mouse, is associated with each of the sets. For example, one click represents the first set, two clicks represents the second set, and so on. Next, all the digits from the first set are randomly distributed into a second group of sets with one condition. The condition is that each of the second group of sets may only contain a single digit from one of the first group of sets. Thus, if there are four digits in the first set from the first group, then each of these digits are distributed randomly into four different sets in the second group. Once the digits from the first set are randomly distributed into the second group of sets, the digits from the second set in the first group are then distributed into the second group of sets, then the digits from the third set are distributed, and so on. A user input action, such as a mouse click, is then associated with each set in the second group.

In this fashion, two groups of sets are created, each group of sets including all of the available digits. A user inputs the password by using the first group of sets (i.e., clicking the mouse a certain number of times for each digit), and then inputs the password again using the second group of sets. By comparing the set that the user has selected for each input digits, the software can uniquely determine the digits in the password.

Assignment to Sets and User Interface

Figure 1:
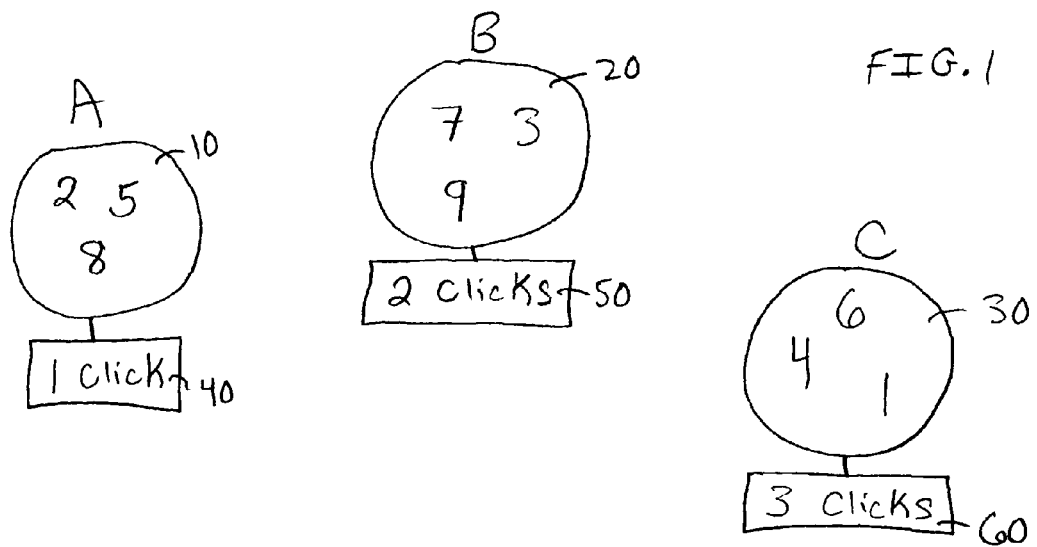
FIG. 1 illustrates a random distribution of digits into a first group of sets.

FIG. 1 illustrates a random distribution of digits into a first group of sets. In this example, three sets are used and the digit 0 is not included in any of the sets. An implementation for accepting a 0 digit is explained below. As shown, each of the three sets 10, 20 and 30 contain three digits. A predetermined number of mouse clicks 40, 50 and 60 are associated with each set. In order to indicate to a computer that a user password begins with the numeral 2, the user notes that the numeral 2 is in set A and that one mouse click is required. Accordingly, to enter a numeral 4, the user would click three times.

Figure 2:
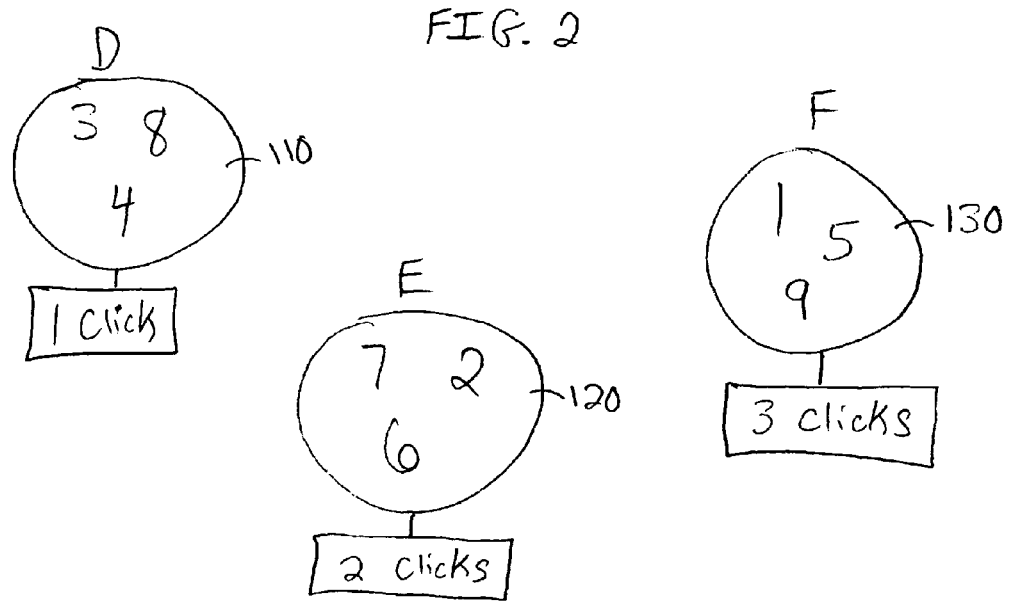
FIG. 2 illustrates a distribution of these digits into a second group of sets.

FIG. 2 illustrates a distribution of these digits into a second group of sets. As shown, each of the three sets 110, 120 and 130 includes three digits. The digits from the set 10 have each been distributed into a single one of the second group of sets, the digits from the set 20 have also been distributed into a single one of the second group of sets, and so on. For example, the digits 6, 4 and 1 from set 30 have each been distributed into one of the second group of sets, with no more than one of these digits being placed into the same set. A predetermined number of mouse clicks 140, 150 and 160 are associated with each of these sets. Considering a simple example, once the user has indicated that his or her password begins with the numeral 2 by clicking once for set 10, the software records that choice and is aware that the password begins with a numeral 2, 5 or 8. Next, once the user inputs the password a second time and selects a set 120 in order to indicate that the password begins with the numeral 2, the software records that choice and is aware that the password begins with the numeral 7, 2 or 6. The software then reconciles the selection of those two sets and reaches the conclusion that the password must begin with the numeral 2. A determination of the other digits in the password proceeds along the same lines.

Figure 3:
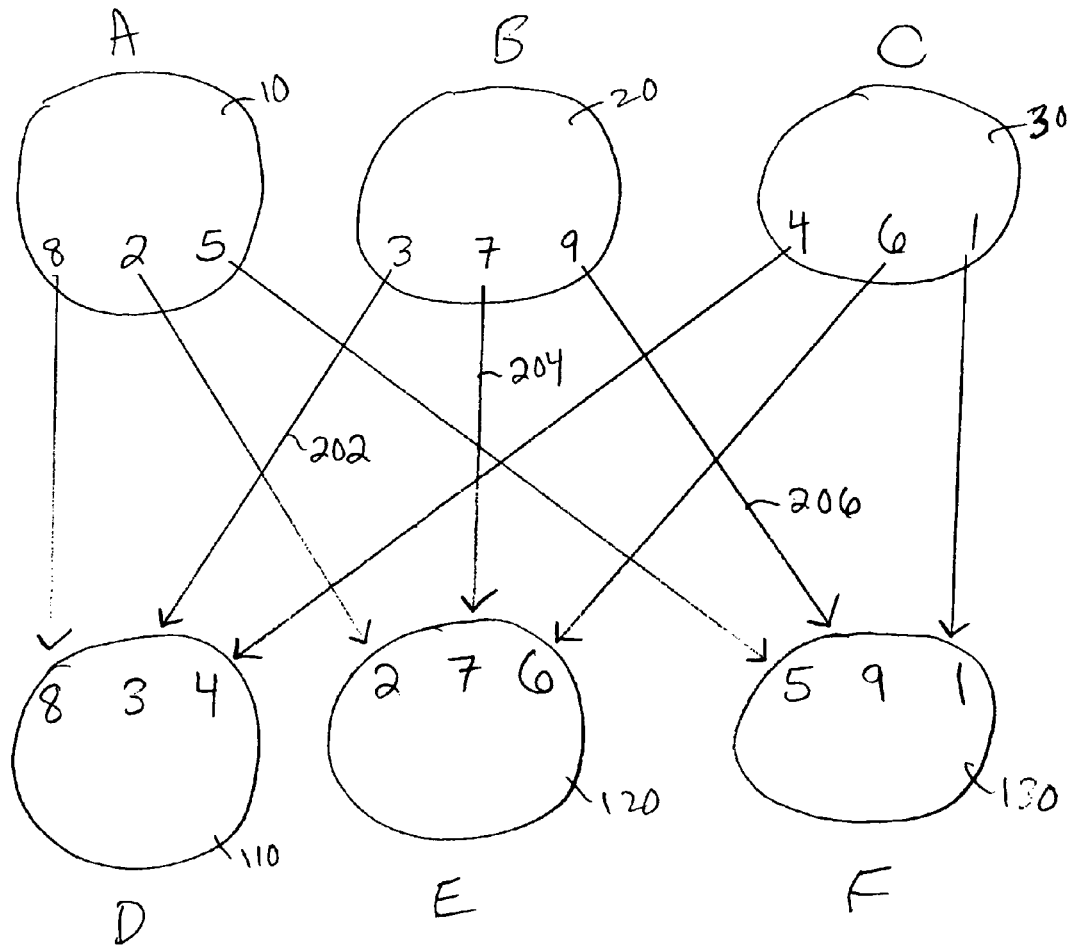
FIG. 3 illustrates distribution of the digits from a first group of sets into a second group of sets.

FIG. 3 illustrates distribution of the digits from a first group of sets into a second group of sets. Considering the digits in set 20 as an example, it is shown the digit 3 is distributed 202 into set 110, that digit 7 is distributed 204 into set 120, and that digit 9 is distributed 206 into set 130. Of course, there may be more or fewer sets. It must be realized, though, that use of more than three sets in either group will require that the user click a mouse (or actuate another mechanism of the computing device) four or more times. It is also possible that there may be fewer than three sets in the first group, for example, two sets having five digits each. In this situation, though, the second group would require five sets in order to ensure that all of the digits from one of the sets in the first group are each distributed to a different set in the second group. This situation would then require a user to click a mouse up to five times in order to select a particular set in the second group. Preferably, there are three sets in each group meaning that, at most, a user will only have to click the mouse three times to select a particular set.

Figure 4A:
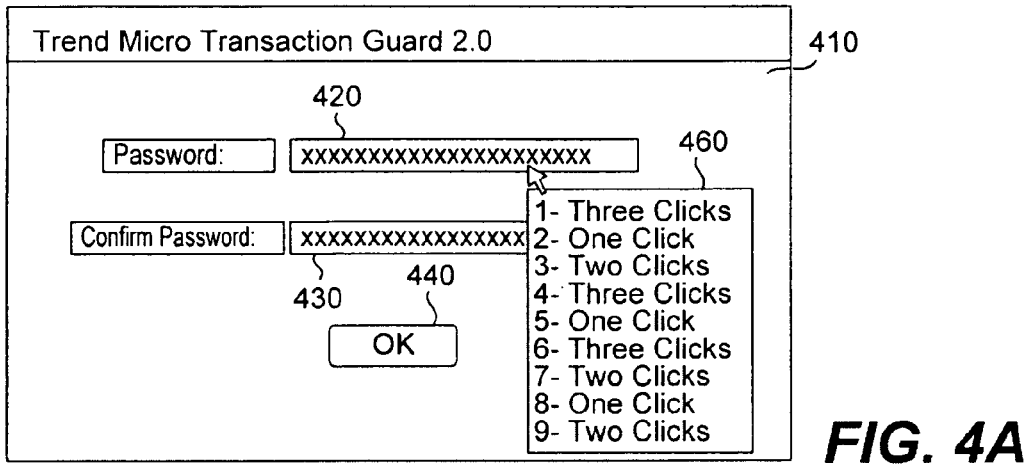
FIG. 4A illustrates an example user interface window.
Figure 4B:
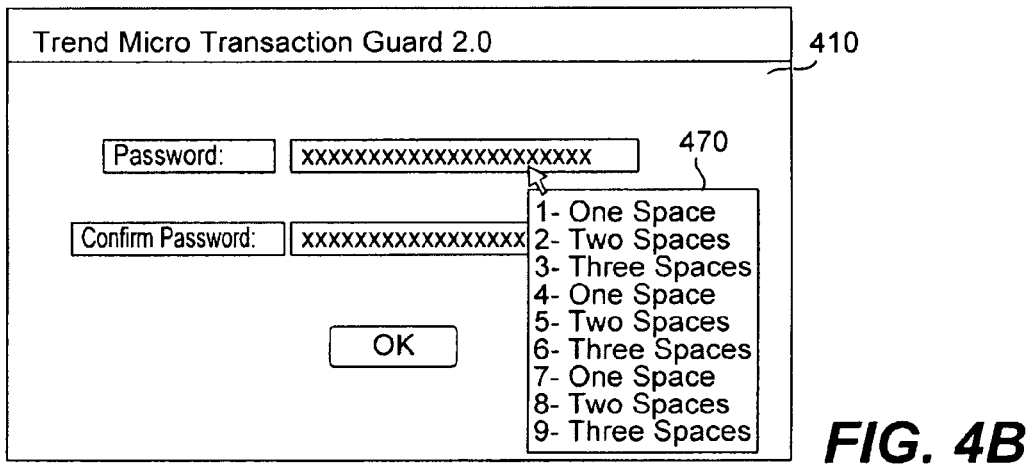
FIG. 4B illustrates a variation on the user interface window.
Figure 4C:
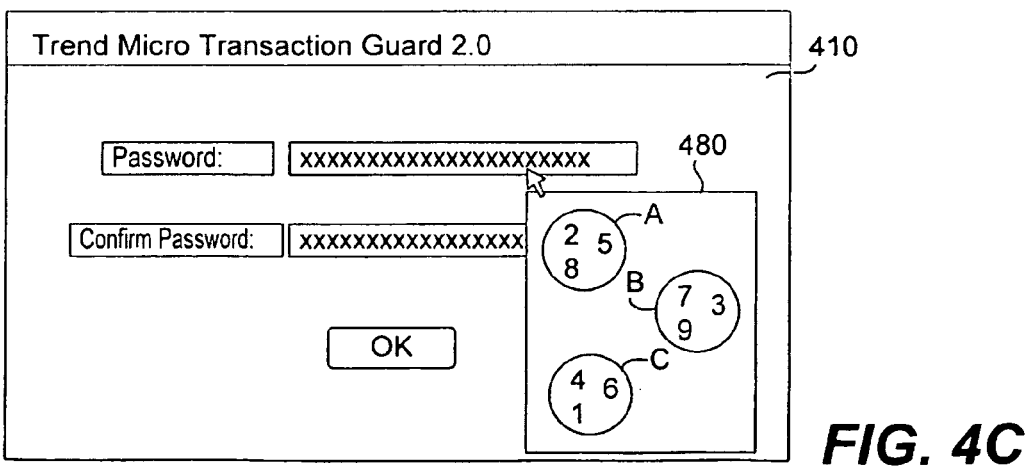
FIG. 4C illustrates another variation on the user interface window.

FIG. 4A illustrates an example user interface window 410. In this example, a user is provided with a password input field 420 and a confirm password input field 430. An OK button 440 allows a user to indicate completion of the input of a single digit or completion of input of the entire password. A user input guide window 460 informs the user in a text fashion which digits belong in which set, i.e., how many clicks are required to choose a certain digit. In this fashion, it is transparent to a user that the digits are being grouped randomly into different sets; the user need only be informed of how many clicks are required to choose a particular digit. FIG. 4B illustrates a variation on user interface window 410. In this variation, user guide window 470 indicates how many times the user should press the space bar in order to choose a particular digit. FIG. 4C illustrates a variation on user interface window 410. In this variation, user guide window 480 presents a graphic guide to which digits are grouped into which sets. A user may press one of the keys A, B or C in order to choose a particular digit, may speak one of these letters in order to choose a particular digit and set, may use the mouse to click one of these sets on the screen, or may touch the screen in order to choose a particular set.

Flow Diagram Embodiment

Figure 5:
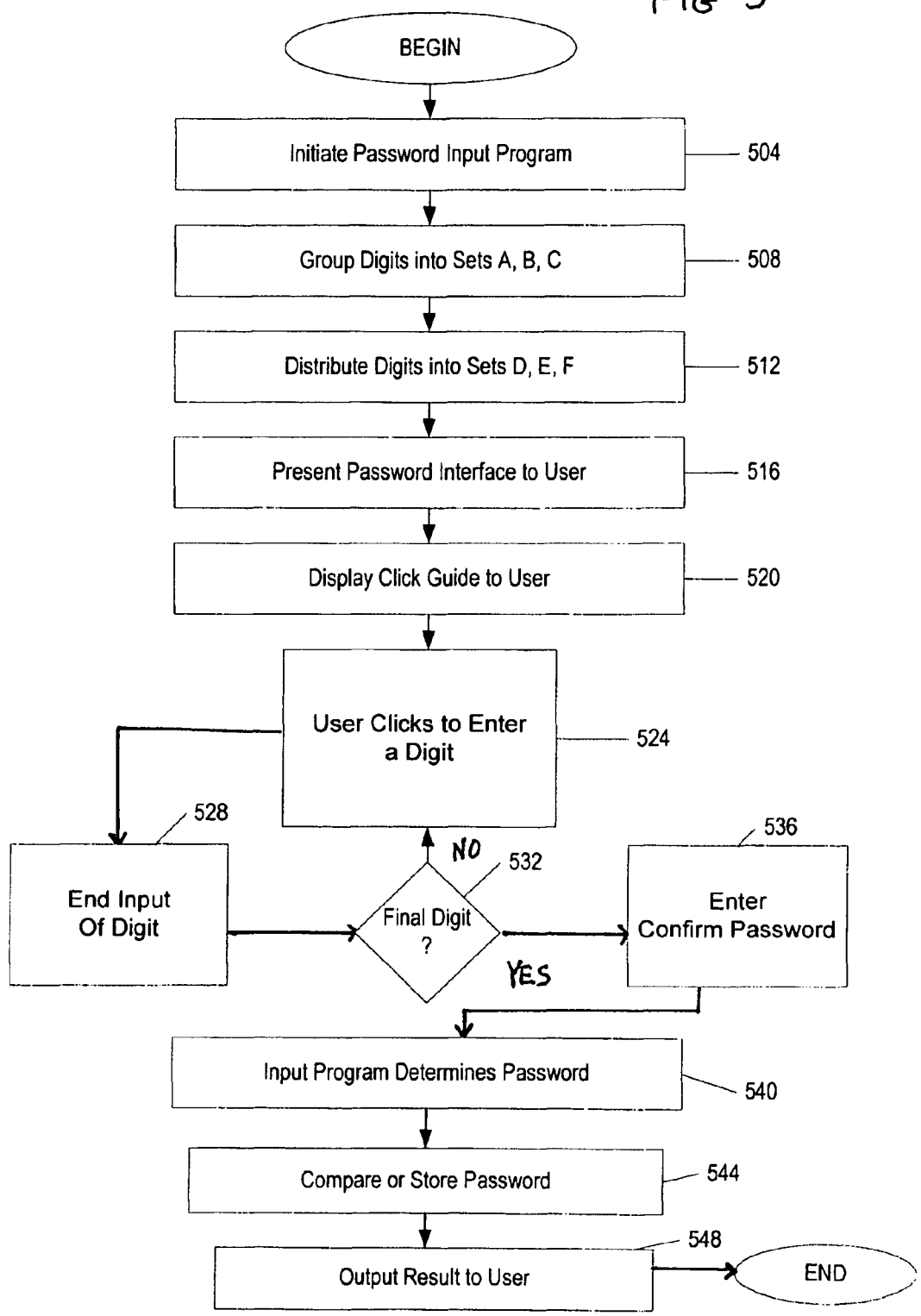
FIG. 5 is a flow chart describing one embodiment of how a password may be entered.

FIG. 5 is a flow chart describing one embodiment of how a password may be entered. In step 504 a password input program is initiated in order to facilitate entry of a user password according to the technique of the present invention.

The password input program may be implemented: as a stand-alone software program on a local user computer, as part of an Internet browser, integrated with keyboard or mouse driver software, as part of any software application, by any Web site requiring a user to enter a password. For example, the present invention may be integrated with Trend Micro "Transaction Guard" software in order to keep track of the password and communicate directly with a browser in order to fill out any required password. In one specific example, the program is hosted at "http://www.trendsecure.com" in conjunction with the "Transaction Guard" software; ActiveX software is used to launch the input program, and the input program itself is written in the C or C++ language.

The password input program may be initiated or launched upon the occurrence of any of a variety of actions. For example, a software application hosted on a Web server, an application hosted on a local user computer or an Internet browser may directly launch the password input program when it is desirable for that application or browser to receive and process a user's password. In one specific example, a Web site launches the input program when a user wishes to log on to the Web site. Or, when a user is setting up any type of account or providing identity information, the input program may be initiated in order to accept and store the user's password the very first time (for later access when the user logs in at a later time). Or, a hardware device such as a computer, smart telephone, personal digital assistant or mobile telephone may implement the password input program and initiate it in order to allow a user to access the hardware device.

In any case, once the password input program is launched it then proceeds to accept data from the user. Step 508 may be performed immediately before displaying an interface and accepting data from a user, may be performed by the input program in the background at any time, and may even be performed after acceptance of user input in order to ready the program for the next user input. Preferably, the randomization and grouping of step 508 is performed for each input of a user password such that the user input behavior is different for each password input, even though the output password will be the same. Such frequent randomization and grouping helps to thwart would-be attackers. Of course, it is also possible to perform the randomization and grouping less frequently or only once for a particular user, device, application or browser. If the randomization and grouping is performed less frequently, the input program also provides the option of a forced reset which will randomize and group the digits again. The digits need not be grouped randomly, but a random distribution provides higher security.

In any case, step 508 randomly groups the nine digits 1 through 9 into three sets A, B and C. For example, these digits are grouped as shown in FIG. 1 into sets 10, 20 and 30. Fewer or greater sets may also be used. Use of fewer sets means that more sets in the second group will be required, resulting in more mouse clicks for the user. Use of greater sets means fewer sets in the second group are needed, but requires more mouse clicks for the user when selecting one of the first sets. Preferably, three sets are used. In this example, the digit 0 is not assigned to one of the sets but its use is implemented as described below. Of course, the digit 0 may be included in one of the sets and one of the other digits may be excluded and implemented as is described below for the digit 0. Additionally, it is possible to implement the present invention using fewer than nine digits, but this means that the user will be limited to only those digits when choosing a password.

Step 508 also assigns a specific type of user input action to each of the three sets in order to associate that particular action with the grouped digits. For example, as shown, each set is assigned a particular number of mouse clicks 40, 50 and 60. Thus, a user indicates that a particular digit in the password is a 7, 3 or a 9 by clicking the mouse twice. Accordingly, the digits have been randomly assigned to a first group of sets.

Step 512 then assigns these digits from the first group of sets into a second group of sets D, E and F. For example, these digits are grouped as shown in FIG. 2 into sets 110, 120 and 130. Fewer or greater sets may be used depending upon the implementation of step 508 as discussed above. Each digit from one of the first group of sets is assigned to a different one of one of the second group of sets such that no two digits from one of the first sets have one of the second sets in common. For example, the digits 2, 5 and 8 from set 10 are distributed one each to the sets 110, 120 and 130 such that each digit is in a different set in the second group. It is not permitted for one of the sets in the second group to include more than one digit from one of the first sets. For example, including the digits 8 and 2 in set 110 would not be permitted. Once the digits are assigned to the second group of sets, a specific type of user input action is assigned to each of the three sets in order to associate that action with the digits of that set. For example, FIG. 2 shows that sets 110, 120 and 130 each require one click, two clicks or three clicks of a computer mouse, respectively, in order to select a digit from that set.

In step 516 a password interface is presented to the user in order to allow the user to input his or her password. The password interface may be presented by the password input program itself or may be presented by the application or browser utilizing the services of the password input program, in which case the user input is passed to the password input program. The password interface may appear on the screen of a computer, mobile telephone, personal digital assistant, etc. FIG. 4 illustrates one example of a password interface. As shown, the "X" characters in the input field represent digits of a user password. In step 528 a user input guide is displayed to the user. This user input guide informs the user how many mouse clicks are required to select a particular digit and reflects the grouping of the digits into the first group of sets.

The user may select a particular digit (and a particular set) by performing a user input action other than by clicking a computer mouse. For example, the user may press a particular key (e.g., the space bar) a certain number of times in order to select a digit, may press a key upon the keypad of a mobile telephone, may tap a touch screen on a computer or mobile telephone a certain number of times, or may perform any similar action that indicates to the password input program that a particular digit and set have been selected. Further, the user input action need not be limited to clicking, tapping or touching a device or screen a certain number of times in order to select a set. For example, the grouping of digits into the first group of sets as shown in FIG. 1 may be displayed graphically to the user on a screen of a device, and the user may select a particular digit in a set by clicking on the set once, tapping or touching the displayed set, giving a voice command to select set etc. Depending upon the user input action that is supported, the user input guide will indicate to the user which type of action is required in order to select a particular set and digit.

Once the password interface and user guide have been presented to the user, the user then performs the appropriate user input action in step 524 in order to enter the first digit of the password. The following discussion will assume that mouse clicks are used to select a particular digit, although any other user input action may also be implemented as discussed above. In one embodiment, the user clicks one two or three times in input field 420 in order to enter the first digit. Of course, the user may also click elsewhere on the screen. In order to enter a digit 0, in one embodiment the user clicks button 440 without performing any clicks in field 420 indicating that the digit is a 0. Or, the user may also click on a dedicated button indicating that the digit should be a 0.

In step 528 an indication is provided to the password input program that input of the first digit has ended. For example, the user may click button 440 in order to indicate that input for the first digit has ended and any later mouse clicks correspond to the second digit. Or, a pause in clicking of a certain duration may indicate to the program that input of a digit has ended. Or, the user may press a particular key or provide a voice command to indicate that input of a digit has ended. Once input of a digit has ended the program or interface may provide visual feedback to the user that a digit has been entered. For example, the first "X" will change color to indicate that this digit has been input. Other forms of visual or auditory feedback may be provided to the user to indicate that a particular digit has been entered.

Step 532 determines whether the final digit in a particular password has been entered. For example, a dedicated button may be provided in the interface signifying that the entire password has been entered when selected by the user. Or, in the case of the user entering a password that the application, Web site or browser already knows, the input program will automatically determine that the final digit has been entered because the password has a known length. The user may also press a particular key, or select an item on a screen in order to indicate that the end of the password has been reached. If the final digit has not been entered then control returns to step 524 for input of the next digit.

If the final digit has been entered, then in step 536 the user is prompted to confirm the password by reentering the password into field 430. In step 536 the user reenters the password using the techniques described above in steps 520-532. The only difference is that the displayed user guide displays the number of clicks required to choose a particular digit and set according to the second group of sets, for example those shown in FIG. 2. In this sense then, the user is entering the password for a second time according to the grouping of digits in the second group of sets. The first entry of digits in step 524 was entered according to the first grouping of sets. Once the password has been entered a second time, then control move to step 540.

In step 540 the password input program determines the correct user password based upon the selection of sets in step 524 and the selection of sets in step 536. For example, for a particular digit in the password if the user had chosen set 30 the first time the password was entered, and then chose set 120 the second time the password was entered, then the program determines that the correct digit for that place in the password is a "6," and so on.

Once the input password has been determined, then in step 544 the input program either compares the input password to the previously stored user password or stores the input password for the first time. In a situation where a user is logging in again, the input password is compared to a previously stored password in order to determine if the user should be granted access. If the user is creating a password or account the very first time, then this password is stored in a suitable location and need not be compared. For example, the password may be stored locally on the user computer or mobile telephone, may be stored in an application, in the "Preferences" of an operating system, within browser software, or on a Web site accessible over the Internet. Of course, the password input program may simply pass the determined password on to its calling application such as a browser, operating system, hosted application, etc., so that calling application may perform the comparison or storing of the password.

In step 548 and output result is presented to the user. In the case where the input password is being compared to a previously stored password for the purposes of logging in, the user may be provided with a visual or auditory indication that the password has been accepted or that the password does not match and access has been denied. For example, an on-screen message indicates access or denial. Or, in the case where a password is being presented for the first time, an on-screen message indicates that the password has been accepted or that an account has been set up, and that the password has been stored for later use. The output result may be generated and performed by the password input program itself or by the application, Internet browser or computing device that uses the services of the input program.

Specific and Alternative Embodiments

Figure 6:
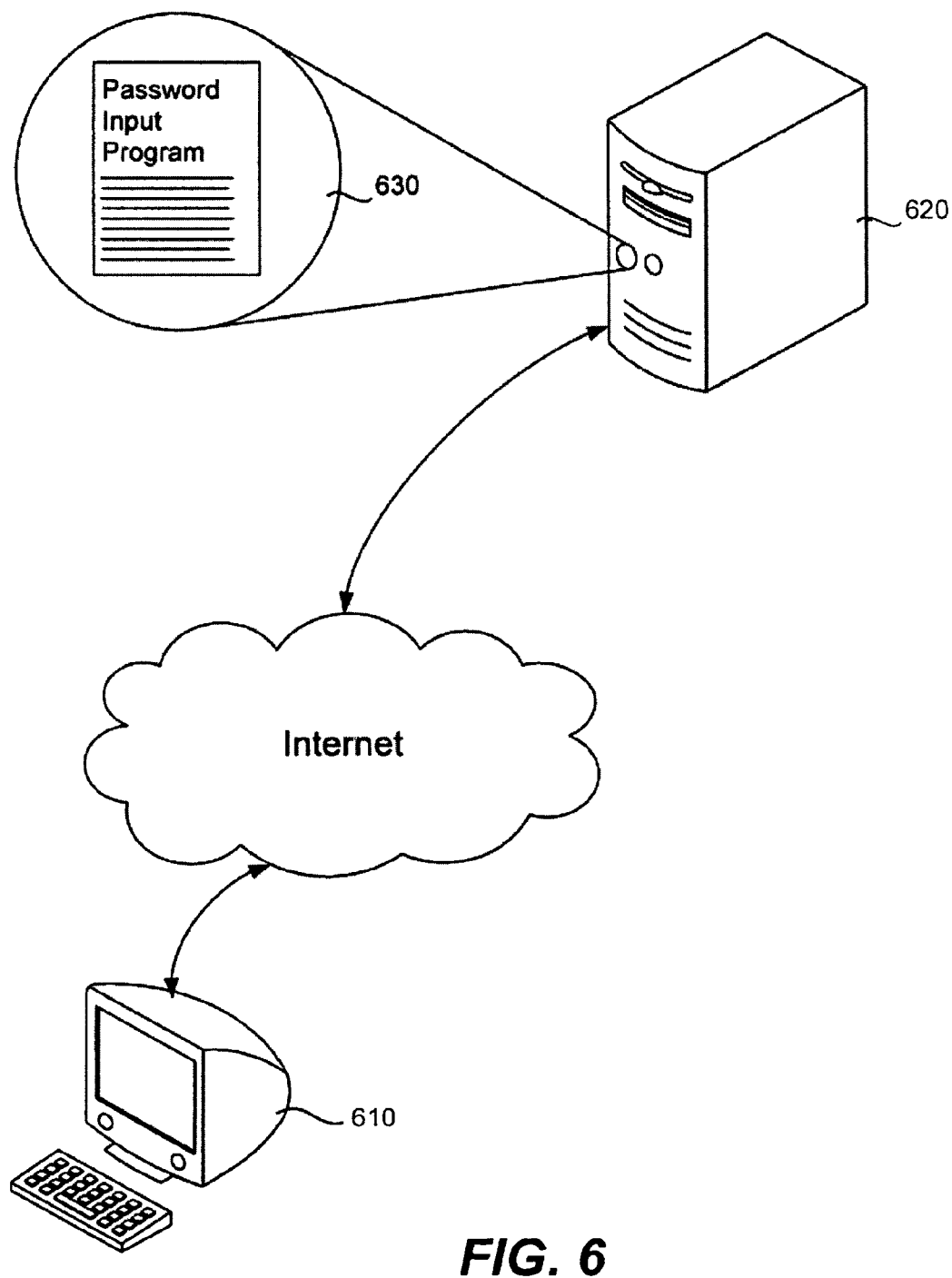
FIG. 6 illustrates a specific embodiment of the present invention.

FIG. 6 illustrates a specific embodiment of the present invention. In this example, a user accesses a Web site over the Internet using local computer 610 running any suitable Internet browser. The Web site is resident upon Web server 620 that hosts any suitable software application. The software application calls upon password input program 630 (also resident upon the Web server) in order to use the technique of the present invention. The password input program (or the software application) is allowed to store data relating to the groupings of sets and password information in memory of the Web server.

Figure 7:
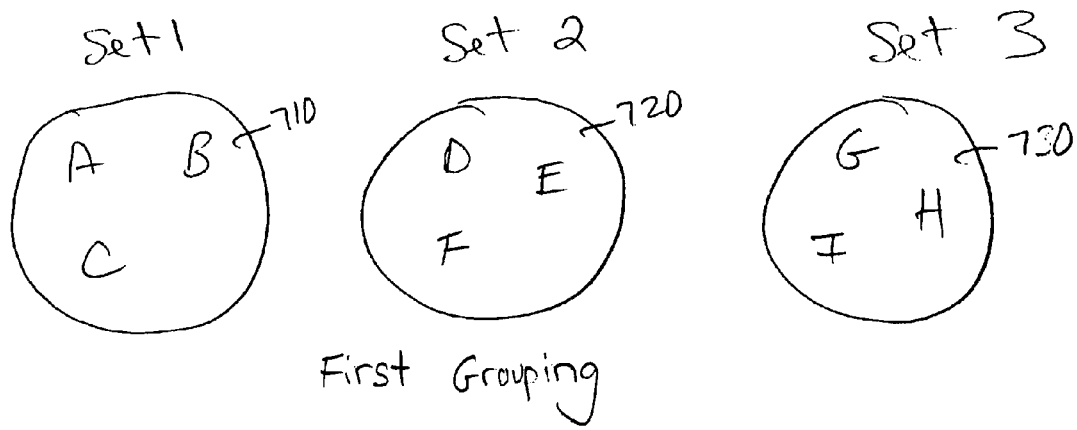
FIG. 7 illustrates an alternative embodiment.
Figure 7:
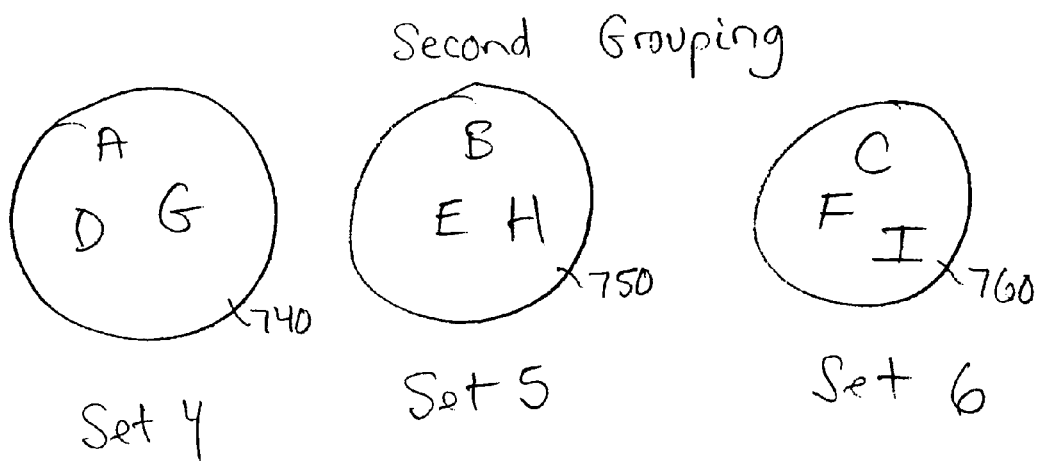

The above description has described the inventive technique in terms of identification of digits in a password. The invention, however, is not limited to use of only digits in the password. For example, if each of the digits 0 through 9 were represented by a different letter of the alphabet then a user password may be chosen using these letters instead of digits. FIG. 7 illustrates an alternative embodiment 700.

In this embodiment a user password may be constructed using the nine letters A through I. A first grouping is shown in sets 710, 720 and 730 and a second grouping is shown in sets 740, 750 and 760. In order to choose a particular letter for a position in the user password, the user chooses one from the first group of sets and one from the second group of sets as described above. Using this technique, the password need not be limited to digits and letters but may include other symbols as well. For example, a password may be constructed using the digits 0 through 6 and the symbols "*", "/" and "&" if these symbols replace respectively the digits 7, 8 and 9. Or, a password may be constructed entirely of these types of symbols, or the password may include digits, letters and symbols. As used herein, the word "symbol" is used to mean not only these types of symbolic characters found on a keyboard, but also digits and letters.

Computer System Embodiment

Figure 8A:
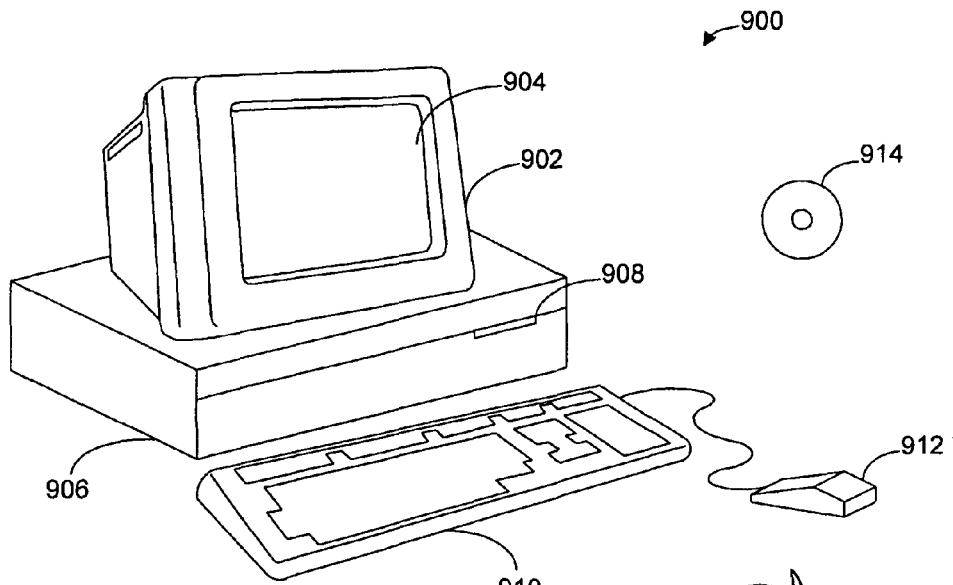
FIGS. 8A and 8B illustrate a computer system suitable for implementing embodiments of the present invention.
Figure 8B:
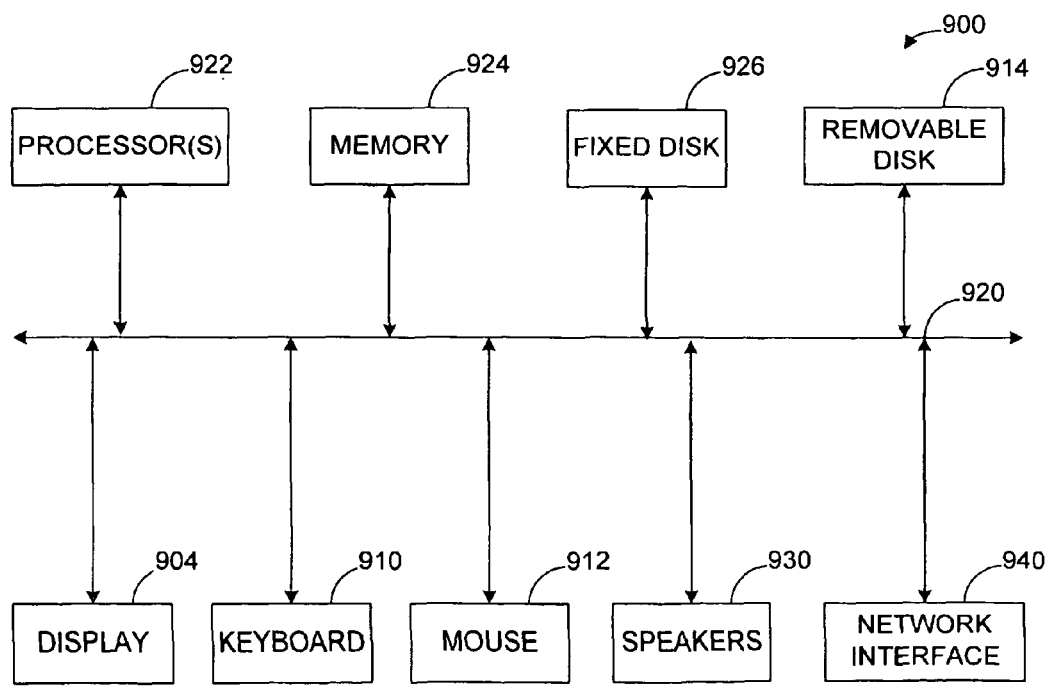

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of determining a password, said method comprising:
   randomly assigning, by a computing device, a plurality of symbols to a first group of sets, each set of said first group of sets including at least two of said plurality of symbols;
   assigning, by a computing device, said plurality of symbols to a second group of sets, each set of said second group of sets containing only a single symbol from each set of said first group of sets;
   receiving a first input action from a user selecting one of said first group of sets;
   receiving a second input action from a user selecting one of said second group of sets;
   determining a correct symbol in a password of said user by determining a symbol that is contained in both the selected one of said first group of sets and the selected one of said second group of sets; and
   outputting a result based upon said determining a correct symbol.

2. A method as recited in claim 1 wherein said symbols are digits.

3. A method as recited in claim 1 wherein said first input action from a user includes clicking a computer mouse, pressing a key, or touching a screen of a computing device.

4. A method as recited in claim 1 wherein said first and second input actions include actuating an input device of a computing device a certain number of times in order to select one of said first or second group of sets.

5. A method as recited in claim 1 wherein said outputting further comprises:
   providing feedback to said user that said determined correct symbol matches a stored symbol in a stored password of said user.

6. A method as recited in claim 1 wherein said outputting further comprises:
   storing said determined correct symbol in a memory of a computing device as representing a valid symbol in said password of said user.

7. A method of accepting a user password, said method comprising:
   displaying an interface to a user on a computing device that includes a first password input field and a second password input field;
   displaying to said user on said computing device an image of digits randomly assigned to a first group of sets, each set of said first group of sets including at least two of said digits;
   accepting a first input action from said user indicating one of said first group of sets;
   displaying to said user on said computing device an image of said digits assigned to a second group of sets, each set of said second group of sets containing only a single digit from each of said first group of sets;
   accepting a second input action from said user indicating one of said second group of sets;
   determining a correct digit of said user password by determining a digit that is contained in both the indicated one of said first group of sets and the indicated one of said second group of sets; and
   outputting a result based upon said determining a correct digit.

8. A method as recited in claim 7 wherein said first input action from a user includes clicking a computer mouse, pressing a key, or touching a screen of a computing device.

9. A method as recited in claim 7 wherein said first and second input actions include actuating an input device of said computing device a certain number of times in order to select one of said first or second group of sets.

10. A method as recited in claim 7 wherein said outputting further comprises:
    providing feedback to said user that said determined correct digit matches a stored digit in a stored password of said user.

11. A method as recited in claim 7 wherein said outputting further comprises:
    storing said determined correct digit in a memory of said computing device as representing a valid digit in said password of said user.

12. A method of determining a user password that contains a plurality of password symbols, said method comprising:
    randomly assigning, by a computing device, a plurality of symbols to a first group of sets, each set of said first group of sets including at least two of said plurality of symbols;
    assigning, by a computing device, said plurality of symbols to a second group of sets, each set of said second group of sets containing only a single symbol from each of said first group of sets;
    receiving a first input action from a user selecting one of said first group of sets in order to indicate a first one of said plurality of password symbols;
    repeating said receiving a first input action for each of said plurality of password symbols in said user password, whereby said user selects one of said first group of sets for each of said plurality of password symbols in said user password;
    receiving a second input action from a user selecting one of said second group of sets in order to indicate said first one of said plurality of password symbols;
    repeating said receiving a second input action for each of said plurality of password symbols in said user password, whereby said user selects one of said second group of sets for each of said plurality of password symbols in said user password;

determining said user password by determining a symbol that is contained in both the selected one of said first group of sets and the selected one of said second group of sets; and outputting a result based upon said determined password.

13. A method as recited in claim 12 wherein said plurality of symbols are digits and wherein said plurality of password symbols are digits.

14. A method as recited in claim 12 wherein said first input action from a user includes clicking a computer mouse, pressing a key, or touching a screen of a computing device.

15. A method as recited in claim 12 wherein said first and second input actions include actuating an input device of a computing device a certain number of times in order to select one of said first or second group of sets.

16. A method as recited in claim 12 wherein said outputting further comprises:

providing feedback to said user that said determined password matches a stored password of said user.

17. A method as recited in claim 12 wherein said outputting further comprises:

storing said determined password in a memory of a computing device as representing a valid password of said user.

18. The method of claim 1, wherein each of the first group of sets and each of the second group of sets contain two or more symbols.

\* \* \* \* \*